United States Patent [19]

Takanashi et al.

[11] Patent Number: 5,164,854
[45] Date of Patent: Nov. 17, 1992

[54] POLARIZATION CONVERTER FOR CONVERTING UNPOLARIZED LIGHT TO LINEARLY POLARIZED LIGHT

[75] Inventors: Itsuo Takanashi, Kamakura; Shintaro Nakagaki, Miura; Ichiro Negishi; Tetsuji Suzuki, both of Yokosuka; Fujiko Tatsumi, Yokohama; Ryusaku Takahashi; Keiichi Maeno, both of Yokosuka, all of Japan

[73] Assignee: Victor Company of Japan, Ltd., Yokohama, Japan

[21] Appl. No.: 736,091

[22] Filed: Jul. 26, 1991

Related U.S. Application Data

[63] Continuation-in-part of Ser. No. 623,236, Dec. 4, 1990.

[30] Foreign Application Priority Data

Jul. 27, 1990 [JP] Japan .................... 2-200587
Nov. 21, 1990 [JP] Japan .................... 2-316863

[51] Int. Cl.5 .................... G02B 27/28; G02F 1/01
[52] U.S. Cl. .................... 359/256; 359/495; 359/496
[58] Field of Search .............. 359/487, 494, 495, 247, 359/246, 251, 256, 496

[56] References Cited

U.S. PATENT DOCUMENTS

| | | |
|---|---|---|
| 3,753,608 | 8/1973 | Bernal . |
| 4,125,843 | 11/1978 | Whitby .................... 359/495 |
| 4,564,931 | 1/1986 | O'Hara et al. .................... 359/495 |
| 4,682,311 | 7/1987 | Matsubayashi et al. ............ 359/495 |
| 4,802,736 | 2/1989 | Gardner et al. .................... 359/495 |
| 5,042,921 | 8/1991 | Sato et al. .................... 359/73 |
| 5,048,926 | 9/1991 | Tanimoto .................... 359/495 |

FOREIGN PATENT DOCUMENTS 1-201693 8/1989 Japan .

OTHER PUBLICATIONS

Imai et al, "Polarization Converter for High Brightness Projection Optical System of Liquid Crystal Light Valve Projector", *1989 Fall Convention of the Institute of Electronics, Information and Communication Engineers,* Preprint No. 5, p. 34.

Primary Examiner—Bruce Y. Arnold
Assistant Examiner—Martin Lerner
Attorney, Agent, or Firm—Michael N. Meller

[57] ABSTRACT

There is provided a polarization converter for producing a beam of linearly polarized light from a randomly polarized light. The randomly polarized light is separated into a first polarized light which is projected in a first predetermined direction and a second polarized light having a predetermined angular relationship with the first polarized light. The second polarized light is converted into a third polarized light a polarization of which is identical to that of the first polarized light. By providing a predetermined two-dimensional positional relationship between the first and third polarized lights, the beam of linearly polarized light is produced and advanced on the outside of the converter in a second predetermined direction.

2 Claims, 5 Drawing Sheets

POLARIZATION CONVERTER FOR CONVERTING UNPOLARIZED LIGHT TO LINEARLY POLARIZED LIGHT

This is a continuation-in-part application of U.S. patent application Ser. No. 623,236, filed Dec. 20, 1990.

BACKGROUND OF THE INVENTION

The present invention relates to a polarization converter which efficiently converts a randomly polarized light (unpolarized light) into a linearly polarized light.

Recently, large screen image projectors utilizing a light modulators of twisted nematic type liquid crystals are becoming popular. For this type of image projector, a linearly polarized light is needed as a projection light, and this is true of other types of image projectors utilizing optical devices having an electrooptic effect for the operation of the projectors.

In this regard, a conventional system to obtain such a linearly polarized light is that a randomly polarized light generated from a high intensity light source such as an incandescent or arc lamp, is passed through an optical analyzer. However, this conventional system is poor in efficiency as the energy of the utilizable linearly polarized light is less than half of the energy of the original randomly polarized light.

Some improvements with respect to this efficiency problem are disclosed in the following prior art:

(1) Polarization Converter Element for High Intensity Liquid Crystal Projection System, preprint No. 5-page 34 for the 1989 Fall Convention of The Institute of Electronics, Information and Communication Engineers, in which a P-polarized light is converted into an S-polarized light or vice versa by a total reflection system. (Note: P-polarized light is a linearly polarized light of which the plane of polarization is perpendicular to the plane of incidence of the light before conversion, whereas an S-polarized light is a linearly polarized light of which the plane of polarization is perpendicular to the P-polarized light.)

(2) Japanese Laid-open Patent Application No. 1 (1989)-201693 in which a P-polarized light and an S-polarized light are combined together after being modulated by respective liquid crystal modulators.

However, the system of prior art (1) involves many optical components that make the system too complicated and the P-polarized light and the S-polarized light produced in the system have their respective light paths differing from each other and this is liable to cause disagreement between the two lights upon landing on the light modulator (liquid crystal panel) for image projection. The system of the prior art (2) requires two independent light modulators (liquid crystal panels) to produce modulated light beams to be combined thereafter by a polarization beam splitter, and because of this optical arrangement, the system is liable to cause disagreement between two images respectively produced by the two independent light modulators.

SUMMARY OF THE INVENTION

A primary object of the present invention is to provide an improved polarization converter which efficiently converts a randomly polarized light into a linearly polarized light using a minimum number of optical components.

In carrying out our invention in one preferred mode, we utilize a polarization converter for producing a beam of linearly polarized light from a randomly polarized light which comprises first means for receiving the randomly polarized light, out of which the first means projects first polarized light in a first predetermined direction, and projects a second polarized light having a predetermined angular relationship with the first polarized light, second means for converting the second polarized light into a third polarized light a polarization of which is identical to that of the first polarized light, and third means for producing the beam of linearly polarized light advancing on the outside of the polarization converter in a second predetermined direction by providing a predetermined two-dimensional positional relationship between the first and third polarized lights, wherein the third means comprises means for directing the third polarized light towards a predetermined position so that the first and third polarized lights converge on the position.

A primary advantage of this invention is to provide a high efficiency polarization converter of few constitutent optical components, and which converts randomly polarized light into a beam of linearly polarized light without wasting the energy of the original randomly polarized light incident to the polarization converter. The invention and its advantages will become more apparent from the detailed description of the invention presented below.

DETAILED DESCRIPTION OF THE PREFERRED EMBODIMENTS

Polarization converters according to the present invention and display apparatus using the same will be described hereinbelow in detail with reference to the attached drawings.

The display system shown in FIGS. 1 through 5 also uses a polarization beam splitter to separate a randomly polarized light (unpolarized light) into an S-polarized light and a P-polarized light and uses a phase plate to make one of the planes of polarization of the S-polarized light and the P-polarized light the same as the other plane of polarization. Then, two polarized lights for which the planes of polarization are the same converge on a light modulator so that the display on an image screen has a high brightness with no unevenness in the brightness.

Figure 1:
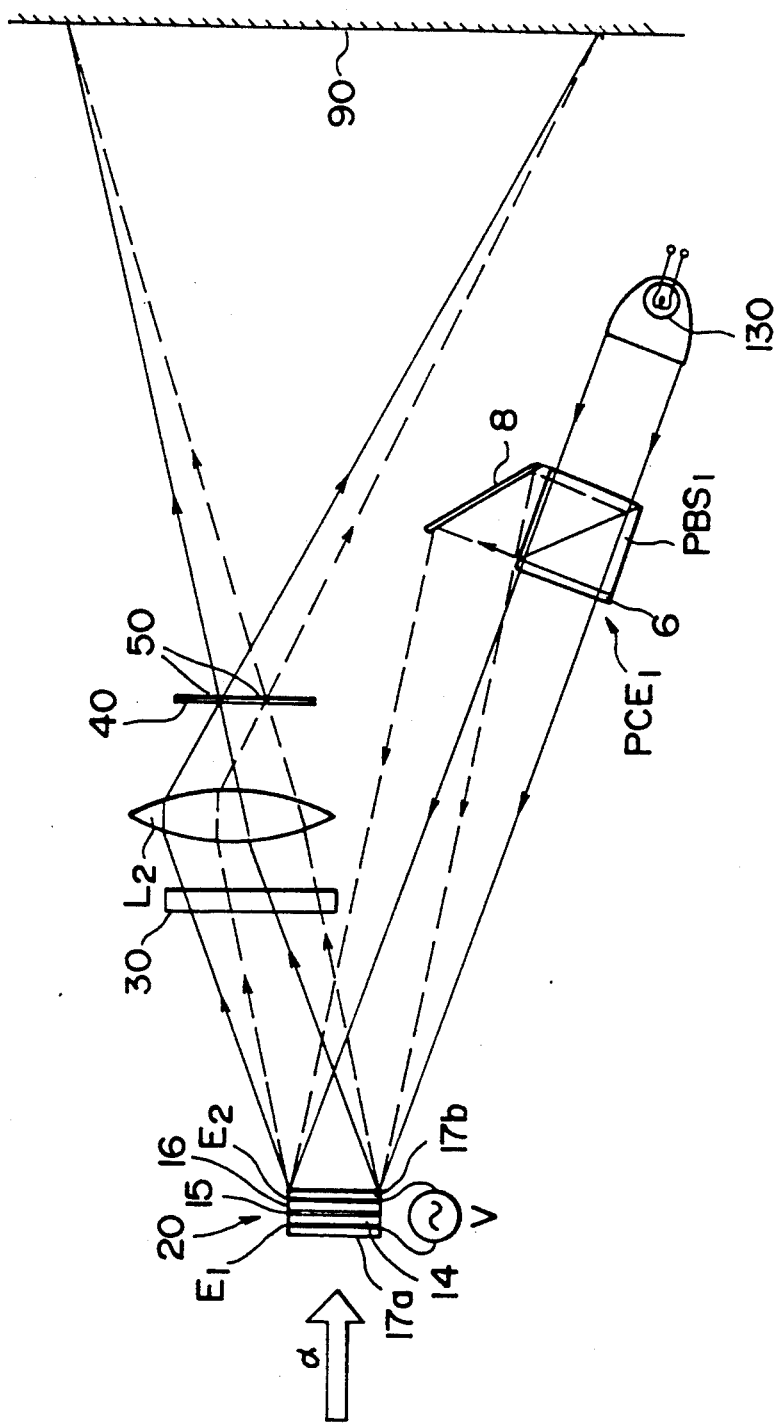
FIG. 1 is a diagrammatic representations of a first embodiment of the present invention using a polarization convertor.

The display system shown in FIG. 1 comprises a light source 130 comprised of an incandescent lamp or the like, a polarization converter $PCE_1$, a light modulator 20, a projection lens $L_2$, an analyzer 30, a shield 40 provided with a pair of pinholes 50 and a screen 90. The system is further provided with members which arrange the shown elements in predetermined relative positions, but the depiction of such members is omitted for the brevity.

The polarization converter $PCE_1$ is configured from a polarization beam splitter $PBS_1$, a halfwave plate/5 and a reflective mirror 8. The beam splitter $PBS_1$ is typically a cubic optical block being a pair of prisms combined together to form a 45° boundary plane where multiple layers of film are sandwiched to serve as a polarizer. The mirror 8 is fixed so that its reflecting surface has a minute predetermined angle to the boundary plane within the beam splitter $PBS_1$.

The light modulator 20 is a reflective liquid crystal light modulator, and is configured from a photoconductive layer member 14, a dielectric mirror 15, a photomodulation layer member 16, two transparent electrode layers $E_1$ and $E_2$ that sandwich the three layers mentioned above therebetween, and transparent substrates 17a and 17b. Both of the electrode layers $E_1$ and $E_2$ are connected to a power supply V. The electric field that is generated between both the electrode layers $E_1$ and $E_2$ due to the impressing of a voltage from the power supply V causes a charge image corresponding to an optical image included in a writing light from the direction indicated by an arrow α to be applied to the photoconductive layer 14. In accordance with this charge image, the linearly polarized light that is irradiated to the photomodulation layer member 16 is photomodulated in rotation of the plane of polarization.

As shown in FIG. 1, when the randomly polarized light from the light source 130 is irradiated to the polarization beam splitter $PBS_1$ of the polarization converter $PCE_1$, the P-polarized light advances and is irradiated from the polarization beam splitter $PBS_1$. Meanwhile, the S-polarized light is reflected in the polarization beam splitter $PBS_1$ and irradiated therefrom. In this manner, of the linearly polarized lights that are separated by the polarization beam splitter $PBS_1$, the S-polarized light is reflected by the mirror 8 and the P-polarized light is converted into an S-polarized light by the halfwave plate 6. Then, both of the S-polarized light beams are merged (or converged) on the photomodulation layer member 16 via the transparent substrate 17b of the light modulator 20. The merged S-polarized light undergoes modulation in rotation of polarization plane in accordance with the charge image that is written to the photomodulation layer member 16, is reflected by the dielectric mirror 15 and is emitted from the side of the transparent substrate 17b. The emitted light undergoes the conversion of modulation to intensity modulation by the analyzer 30 and is projected to the screen 90 via the lens $L_2$ and the pinholes of the shield 40. By this, an image corresponding to the optical image from the direction of the arrow α is projected onto the screen 90.

The relative position of the screen 90 is, as shown in the FIG. 1, the place where the S-polarized lights having the same information converge to form the image. By this, it is possible to have a higher contrast than attainable with a display system using a conventional polarization converter, and also it is possible to display an image having a high brightness with practically no brightness unevenness.

Figure 2:
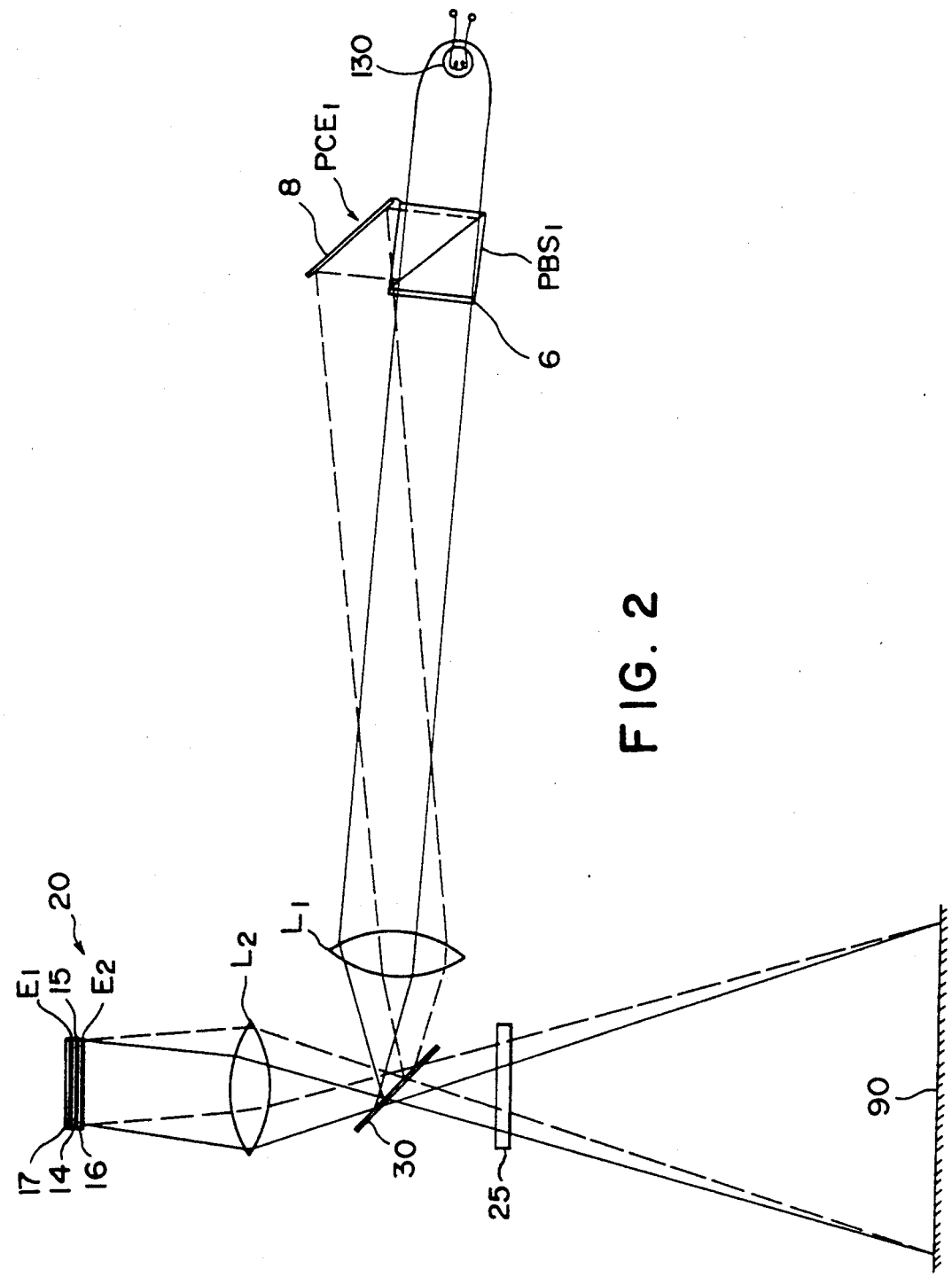
FIG. 2 is a diagrammatic representations of a second embodiment of the present invention using a polarization convertor.

The display system shown in FIG. 2 is provided with a focussing lens $L_1$ and a pinhole mirror 30. This mirror 30 is provided with pinholes having a size large enough to allow the spots of linearly polarized light formed by the focussing lens $L_1$ to pass therethrough. In the figure, those elements of the display system the same elements as those in FIG. 1, are shown with corresponding numerals, and the corresponding descriptions of them are omitted. The same applies to FIGS. 3 and 5.

The S-polarized lights obtained from the polarization converter $PCE_1$ form spots by the focussing lens $L_1$. The pinhole mirror 30 is disposed in the vicinity of these spots. The direction of these S-polarized lights is changed substantially a right angle by the pinhole mirror 30, and so the S-polarized lights are substantially parallel with each other by the lens $L_2$ which irradiates them to the light modulator 20. A charge image the same as that described with respect to FIG. 1, is formed on the photoconductive layer member 14 of the light modulator 20. Both of the irradiated S-polarized lights undergo modulation in rotation of polarization plane corresponding to the charge image in the photomodulation layer member 16, and are reflected by the dielectric mirror 15. The reflected polarized lights are projected to the screen 90 via the lens $L_2$ and the pinhole mirror 30 and are converted to intensity modulated light by the analyzer 25. The light modulator 20 is inclined very slightly with respect to a plane perpendicular to the drawing paper, so that the places (in the mirror area) which reflect the lights from the lens $L_1$ and the pinholes of the mirror 30 which transmit the lights from the lens $L_2$ are slightly displaced each other in depth direction of the drawing paper. The presence of the pinhole mirror 30 enables the display of images having a high resolution and contrast.

In FIG. 2, the angle of mounting of the reflection mirror 8 with respect to the polarization beam splitter $PBS_1$, the distance from the polarization beam splitter $PBS_1$ (halfwave plate 6) and the mirror 8 to the lens $L_1$, the distance from the spot formed by the lens $L_1$ and the distance from the lens $L_2$ to the light modulator 20 are set so that both of the S-polarized light beams converge on the light modulator 20.

Figure 3:
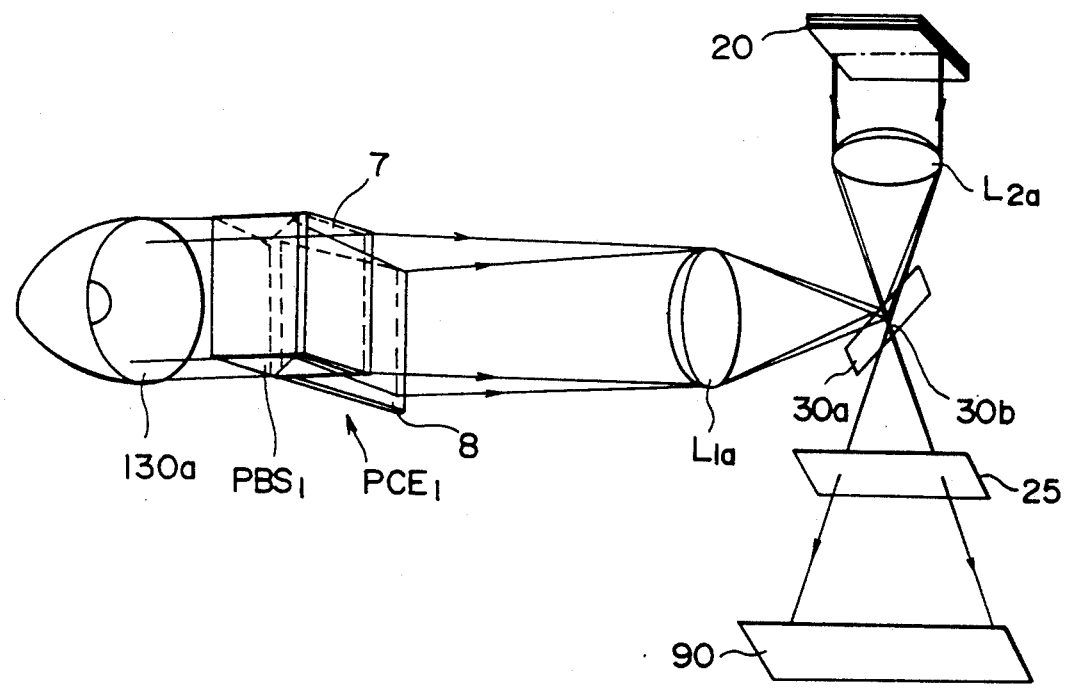
FIG. 3 is a diagrammatic representations of a third embodiment of the present invention using a polarization convertor.

In the display system shown in FIG. 3, a pinhole mirror 30a is provided at the place where both of the S-polarized lights are converged by the lens $L_{1a}$ to form spots. The pinhole mirror 30a is disposed so as to change the direction of the S-polarized lights. The modulated light from the light modulator 20 comes to the vicinity of the pinhole mirror 30a to be converged by the lens $L_{2a}$ to form spots. Accordingly, it is possible to provide pinholes 30b at the places on the pinhole mirror 30a where spots are formed, thereby enabling the display of images having a high resolution and contrast.

Figure 4:
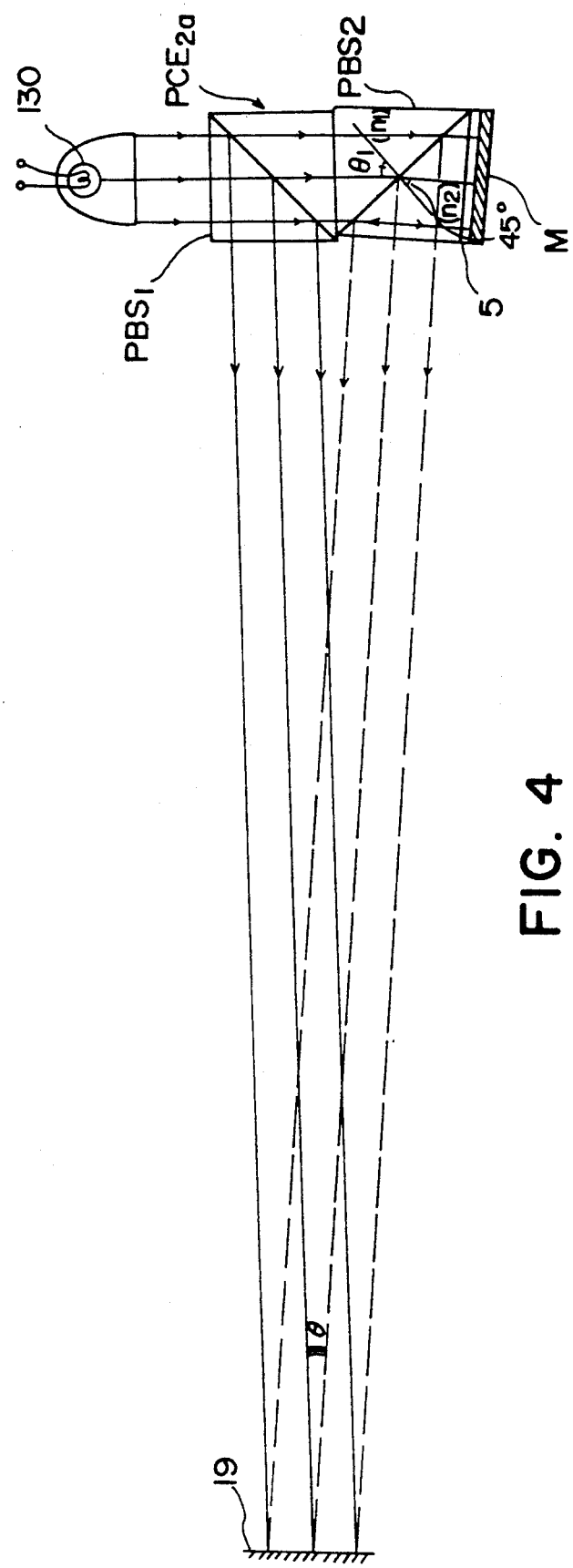
FIG. 4 is a diagrammatic representations of a fourth embodiment of the present invention using a polarization convertor.
Figure 5:
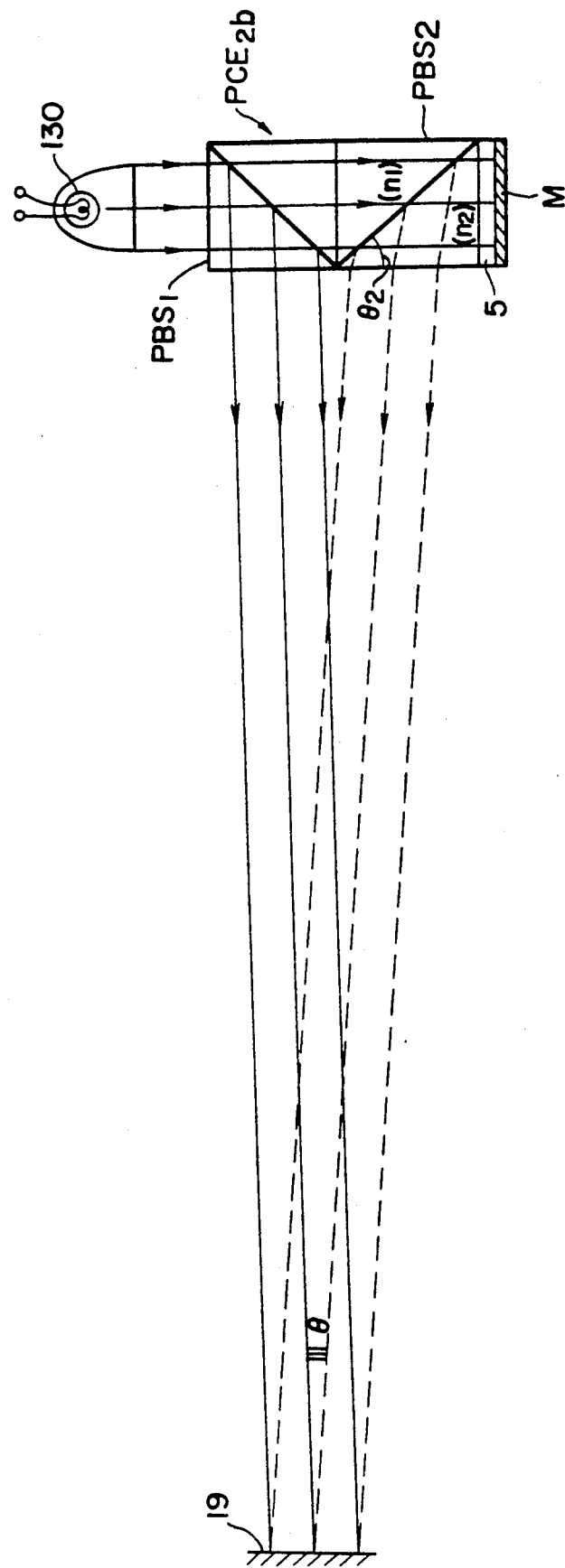
FIG. 5 is a diagrammatic representations of a fifth embodiment of the present invention using a polarization convertor.

In FIGS. 4 and 5 other polarization converters $PCE_{2a}$ and $PCE_{2b}$ according to the invention are shown together with a light source 130. As shown in the figure, this polarization converter $PCE_{2a}$ is configured from a first polarization beam splitter $PBS_1$ to which the randomly polarized light from the light source 130 is irradiated, a second polarization beam splitter $PBS_2$ to which the P-polarized light (or S-polarized light) is irradiated from the beam splitter $PBS_1$, a λ/4 plate that converts the P-polarized light (or S-polarized light) emitted from the beam splitter $PBS_2$ into the S-polarized light (or P-polarized light) and again irradiates it to the $PBS_2$, and a reflection mirror M, laminated in this order.

Here, if the refractive indexes n1 and n2 of the polarization beam splitter $PBS_2$ are thought of as being regulated by the law of refraction $$n1 \sin \theta_1 = n2 \sin 45°$$

If the angle of refraction is 45°, then by making $\theta_1 = 45° + \theta$, the refractive index of the glass of the $PBS_2$ (and/or the shape of the $PBS_2$) is selected so that the two polarized lights converge on the positions of a plane 19. If the refractive index $n1 = n2$, then it is possible to set the angle $\theta_2$ to a required value that is less than 45° as shown in FIG. 5.

Even if the polarization converter $PCE_{2a}$ or $PCE_{2b}$ shown in FIG. 4 or 5 is used instead of the polarization converter $PCE_1$ of the display system shown in FIGS. 1 through 3, it is obvious that it is possible to configure a display system that provides the same effect.

In the description above, the description was given for when a phase plate is mounted to the side (the side of emission of the P-polarized light) of the surface of the polarization beam splitter, in which the polarized light progresses, but the configuration of the polarization converter can be such that the phase plate is mounted to the side that reflects (the side of emission of the S-polarized light). Each of the embodiments are not limited to using a halfwave plate or a $\lambda/4$ plate as the phase plate that converts the P-polarized light emitted from the polarization beam splitter into the S-polarized light. A crystal or a liquid crystal having an opto-electrical effect can be used instead of the phase plate and this is driven electrically in a configuration where the irradiated linearly polarized light has its direction of polarization rotated by 90° before being emitted. The light modulator 20 was configured as a reflecting type but it is also possible to configure a display system using a light modulator of the transmissive type without the dielectric mirror 15.

In addition, the liquid crystal light modulator of a type transmissive or reflective is typically a twisted nematic type liquid crystal, however, other types of light modulator having a polarization or a birefringence characteristic such as lithium niobate or PLZT material, may be utilized. Further, the polarization converters of the present invention may be applied to not only image display systems but also to other systems such as optical computers and recording/playback systems.

As has been described above, according to the display system using the polarization converter of the present invention, two emitted polarized lights from a polarization converter always converge (or merge) and so there is the excellent effect of being able to realize image display at high brightness and without brightness unevenness.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A display system for displaying an image on a screen, comprising:
   a light source for generating a randomly polarized light;
   first means for separating the randomly polarized light into first and second polarized lights so as to have a predetermined angular relationship with each other;
   second means for converting the second polarized light into a third polarized light a polarization of which is identical to that of the first polarized light and projecting the third polarized light in a predetermined direction;
   third means for directing the first polarized light towards a predetermined position so that the first polarized light and third polarized light projected in the predetermined direction converge on the predetermined position;
   modulation means for modulating the first and third polarized lights converging on the predetermined position in accordance with the image;
   lens means for magnifying the image included in the first and third polarized lights thus modulated by a predetermined magnitude; and
   guide means having pinholes, for projecting the first and third polarized lights including the image thus magnified onto the screen in a way that the first and third polarized lights including the image thus magnified pass through the pinholes and converge on a specific position on the screen.

2. A display system for displaying an image on a screen, comprising:
   a light source for generating a randomly polarized light;
   first means for separating the randomly polarized light into first and second polarized lights so as to have a predetermined angular relationship with each other;
   second means for converting the second polarized light into a third polarized light a polarization of which is identical to that of the first polarized light and projecting the third polarized light in a first predetermined direction;
   third means for directing the first polarized light in a second predetermined direction different from the first predetermined direction;
   fourth means for making the first and third polarized lights directed in the first and second directions respectively converge on a predetermined position;
   modulation means for modulating the first and third polarized lights converging on the predetermined position in accordance with the image;
   lens means for magnifying the image included in the first and third polarized lights thus modulated by a predetermined magnitude; and
   guide means having pinholes, for projecting the first and third polarized lights including the image thus magnified onto the screen in a way that the first and third polarized lights including the image thus magnified pass through the pinholes and converge on a specific position on the screen.

* * * * *